United States Patent [19]
Buckmaster

[11] Patent Number: 6,045,232
[45] Date of Patent: Apr. 4, 2000

[54] APPARATUS FOR PROVIDING EMERGENCY AND NIGHT LIGHTING

[76] Inventor: Clifford Thoren Buckmaster, 3051 Cora Dr., Maryville, Tenn. 37803

[21] Appl. No.: 09/024,029

[22] Filed: Feb. 16, 1998

[51] Int. Cl.[7] .................................................. B21V 21/02
[52] U.S. Cl. ................................ 362/20; 307/66; 362/20; 320/9; 315/86
[58] Field of Search ................................. 362/20; 307/66; 320/9; 315/86, 88

[56] References Cited

U.S. PATENT DOCUMENTS

| | | | |
|---|---|---|---|
| 4,223,232 | 9/1980 | Bulat | 362/20 |
| 4,305,006 | 12/1981 | Walthall et al. | 362/20 |
| 4,862,038 | 8/1989 | Moten | 362/20 |

*Primary Examiner*—Sandra O'Shea
*Assistant Examiner*—Bertrand Zeade
*Attorney, Agent, or Firm*—Michael I. Kroll

[57] ABSTRACT

An apparatus for detecting failure of a power source and providing illumination of an area upon detection of the failure of the power source. The apparatus for providing emergency and night lighting includes a detection switch connected to the power source for detecting a voltage at terminals of the power source, an alternate power source and an emergency light connected between the detection switch and the alternate power source. The detection switch is operable between a first open position disconnecting the emergency light from the alternate power source upon detection of a voltage at the terminals of the power source and a second closed position connecting the emergency light to the alternate power source and causing the emergency light to illuminate upon detection of an interruption of the voltage at the terminals of the power source. A second light is connected directly to the power source for providing illumination to an area when a voltage is detected at the terminals of the power source. A dimmer switch is also connected between the emergency light and the detection switch for limiting an amount of voltage applied by the alternate power source to the emergency light.

1 Claim, 8 Drawing Sheets

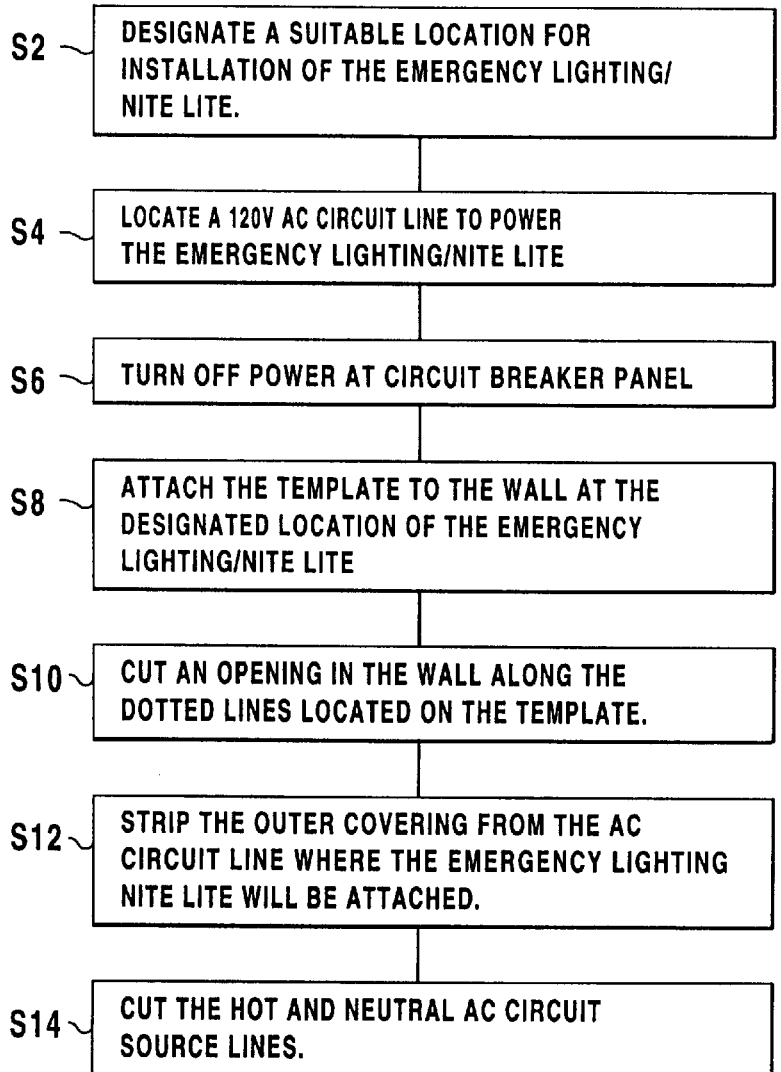

APPARATUS FOR PROVIDING EMERGENCY AND NIGHT LIGHTING

BACKGROUND OF THE INVENTION

1. Field of the Invention

The present invention relates generally to emergency lighting devices and, more specifically, to a device connected to an emergency power supply for detecting a power failure and providing emergency lighting upon detection of such power failure, the emergency power supply being recharged upon restoration of power.

2. Description of the Prior Art

Numerous devices for providing emergency lighting have been provided in the prior art. For example, U.S. Pat. Nos. Des. 366,127; 3,968,355; 4,546,419 and 5,446,343 all are illustrative of such prior art. While these units may be suitable for the particular purpose to which they address, they would not be as suitable for the purposes of the present invention as heretofore described.

U.S. Pat. No. Des. 366,127

Inventor: Se Kit Yuen

Issued: Jan. 9,1996

An ornamental design for an emergency power failure light including a night light is disclosed by this reference. The light is plugged into a conventional wall outlet and includes a light on its face, opposite the plug for connecting with the wall socket. A power switch appears to be on one side thereof.

U.S. Pat. No. 3,968,355

Inventor: John Smallegan

Issued: Jul. 6, 1976

An automatic night light which will change its illumination in response to changes in the ambient light level. The circuit comprises an AC input with the lamp and a solid-state switch connected in series, a resistive voltage divider being connected across the solid-state switch and having series-connected fixed and light-sensitive resistors. The switch gate is connected to the voltage divider tap by a bi-directional conductor. The structure comprises a housing having circuit and lamp portions. The circuit portion has outlet prongs with bent-back ends, a circuit board being supported by notches in the housing and the prong ends. The housing also supports spring contacts which connect the circuit board to the lamp socket in a simple manner, with the light-sensitive device being easily mountable and firmly supported by the housing.

U.S. Pat. No. 4,546,419

Inventor: Kelli J. Johnson

Issued: Oct. 8, 1985

A wall recessed receptacle box contained night light with a photocell light intensity dusk-dawn (or room illumination) on/off switch control equipped with manual dimming control for a darker/brighter night light atmosphere. The night light box is insertable in a recessed box in the wall otherwise used for a normal receptacle outlet and includes at least one plug in receptacle with the light translucent or transparent cover close to flush with the wall in the recessed night light box. The night light has an internal light bulb that may be easily replaced by removing a retaining screw at the top of the cover so that the bottom hinge mounted cover may be pivoted out and down to not only expose the bulb to be replaced but also automatically simultaneously disconnect the electric supply from the bulb socket and eliminate power from the bottom of the bulb in the socket for safety.

U.S. Pat. No. 5,446,343

Inventor: Burt Shulman

Issued: Aug. 29, 1995

A capacitive element is introduced in series with the gate of a switching element in an automatic turn on/off circuit which automatically provides artificial light depending on the ambient light incident on a photo sensitive element of the circuit wherein the capacitive element holds an offset voltage which aids in turning on the switching element and provides a hysteresis in the system which counteracts a slickering effect common to automatic turn on/off circuits controlling an artificial light which employ a photo sensitive device.

SUMMARY OF THE PRESENT INVENTION

The present invention relates generally to emergency lighting devices and, more specifically, to a device connected to an emergency power supply for detecting a power failure and providing emergency lighting upon detection of such power failure, the emergency power supply being recharged upon restoration of power.

A primary object of the present invention is to provide an apparatus for providing emergency and night lighting that will overcome the shortcomings of prior art devices.

Another object of the present invention is to provide an apparatus for providing emergency and night lighting which is able to detect the occurrence of a power failure.

An additional object of the present invention is to provide an apparatus for providing emergency and night lighting which is able to provide emergency lighting upon detection of a power failure.

A further object of the present invention is to provide an apparatus for providing emergency and night lighting including an automatically rechargable alternate power source to prevent the device from illuminating during a power interruption due to a drained alternate power source.

A yet further object of the present invention is to provide an apparatus for providing emergency and night lighting including an additional light bulb for providing lighting to unlit areas or during nighttime hours.

A further object of the present invention is to provide an apparatus for providing emergency and night lighting including a dimmer switch for reducing the intensity of the emergency light.

A still further object of the present invention is to provide an apparatus for providing emergency and night lighting including an on/off switch for selectively turning the emergency light off during a power outage.

Another object of the present invention is to provide an apparatus for providing emergency and night lighting that is simple and easy to use.

A still further object of the present invention is to provide an apparatus for providing emergency and night lighting that is economical in cost to manufacture.

Additional objects of the present invention will appear as the description proceeds.

An apparatus for detecting failure of a power source and providing illumination of an area upon detection of the failure of the power source is disclosed by the present invention. The apparatus for providing emergency and night lighting includes a detection switch connected to the power source for detecting a voltage at terminals of the power source, an alternate power source and an emergency light connected between the detection switch and the alternate power source. The detection switch is operable between a first open position disconnecting the emergency light from the alternate power source upon detection of a voltage at the terminals of the power source and a second closed position connecting the emergency light to the alternate power source and causing the emergency light to illuminate upon detection of an interruption of the voltage at the terminals of the power source. A second light is connected directly to the power source for providing illumination to an area when a voltage is detected at the terminals of the power source. A dimmer switch is also connected between the emergency light and the detection switch for limiting an amount of voltage applied by the alternate power source to the emergency light and thus limiting the intensity of illumination.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIGS. 7A and 7B are a flow diagram illustrating the method of installation and operation of the apparatus for providing emergency and night lighting of the present invention.

DESCRIPTION OF THE REFERENCED NUMERALS

Figure 1:
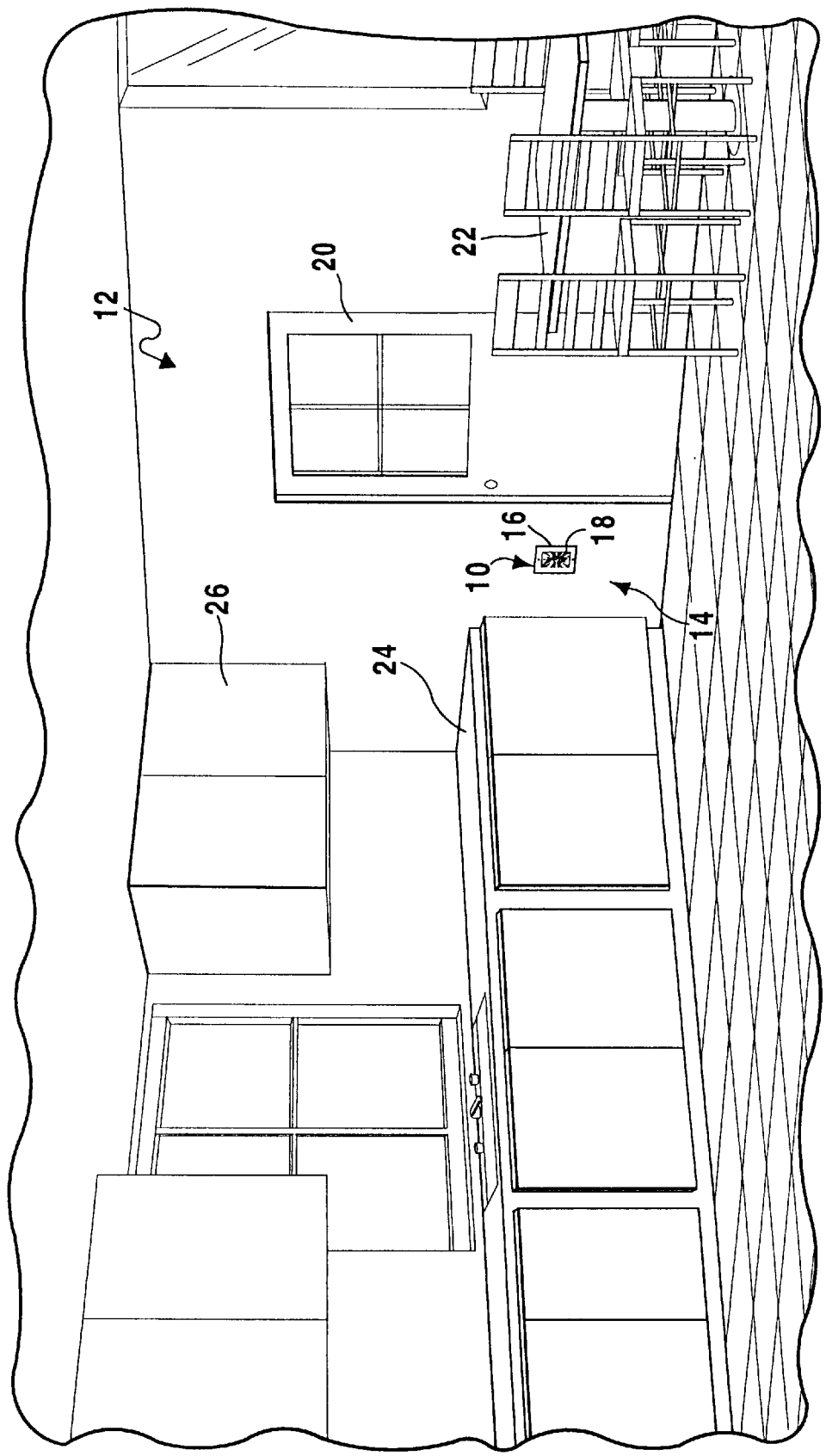
FIG. 1 is a perspective view of the apparatus for providing emergency and night lighting of the present invention positioned within a kitchen area to be illuminated thereby either during a power failure or at night.

Turning now descriptively to the drawings, in which similar reference characters denote similar elements throughout the several views, the Figures illustrate the apparatus for providing emergency and night lighting of the present invention. With regard to the reference numerals used, the following numbering is used throughout the various drawing figures.

10 apparatus for providing emergency and night lighting of the present invention
12 kitchen area which the apparatus for providing emergency and night lighting of the present invention will illuminate during a power failure or at night
14 wall of kitchen
16 face plate of apparatus for providing emergency and night lighting
18 emergency light bulb
20 door
22 table
24 countertop
26 cupboard
28 hallway
30 stairway
32 stairs
34 first recess for securing face plate to wall
36 second recess for securing face plate to wall
38 first screw for securing face plate to wall
40 second screw for securing face plate to wall
42 clear lens of face plate
44 second light bulb
46 dimmer switch
48 casing
50 frame
52 face side of casing
54 first screw for securing casing to wall
56 second screw for securing casing to wall
58 clear plane covering face side of casing
60 reflector
62 120 volt electrical wire
64 ground wire
66 recharging board
68 relay switch
70 connection wire between the emergency light and relay
72 photocell
74 first winding of transformer
76 transformer
78 second winding of transformer
80 rechargeable battery
82 diode
84 first terminal of rechargeable battery
86 first terminal of emergency light bulb
88 second terminal of emergency light bulb
90 first terminal of dimmer switch
92 potentiometer
94 switch in parallel connection with potentiometer
96 second terminal of dimmer switch
98 normally closed switch
100 coil
102 photocell
104 power source
106 DC circuit

DETAILED DESCRIPTION OF THE PREFERRED EMBODIMENT

Turning now descriptively to the drawings, in which similar reference characters denote similar elements throughout the several views, FIGS. 1–6 illustrate the apparatus for providing emergency and night lighting of the present invention. The apparatus for providing emergency and night lighting is indicated generally by the numeral 10.

The apparatus for providing emergency and night lighting 10 of the present invention is clearly illustrated in numerous views and sections in FIGS. 1–6. FIG. 1 illustrates the apparatus for providing emergency and night lighting 10 positioned within a kitchen area 12. As can be seen from this figure, the apparatus for providing emergency and night lighting 10 is positioned on a wall 14 of a kitchen 12 and includes a face plate 16 and a light bulb 18. The apparatus for providing emergency and night lighting 10 connects with conventional wiring running through the walls of any conventional building and should be positioned in an unobstructed area to provide light during periods of power interruption. The apparatus for providing emergency and night lighting 10 should also be positioned in a place determined to provide illumination to the largest area possible or at least to the areas which encounter the largest amount of traffic.

From this figure, it can be seen that the apparatus for providing emergency and night lighting 10 is positioned adjacent a doorway 20 and between a table 22 and a countertop 24. Kitchen cupboards 26 are also adjacent the apparatus for providing emergency and night lighting 10. In this position, the apparatus for providing emergency and night lighting 10 is able to illuminate the doorway in which the door 20 is positioned to aid persons entering and leaving through the door 20 during a blackout period in which electrical power has been interrupted. The apparatus for providing emergency and night lighting 10 is also positioned between the kitchen table 22 and the countertop 24 to thereby aid persons attempting to prepare food and eat the food at the table 20. By illuminating this area during a power interruption, a person is able to safely prepare food and carry the food to the table 22 without incident caused by inadequate lighting should the interruption of power be for an extended period and persons in the effected area become hungry. Additionally, should the person have an accident and spill some food in the area adjacent the apparatus for providing emergency and night lighting 10, the apparatus for providing emergency and night lighting 10 provides illumination for the person to not only aid the person in seeing the spillage but to clean it up before others encounter the mess. The apparatus for providing emergency and night lighting 10 also allows a person to travel throughout the lighted area safely without danger of injury due to a collision with an unseen object.

Figure 2:
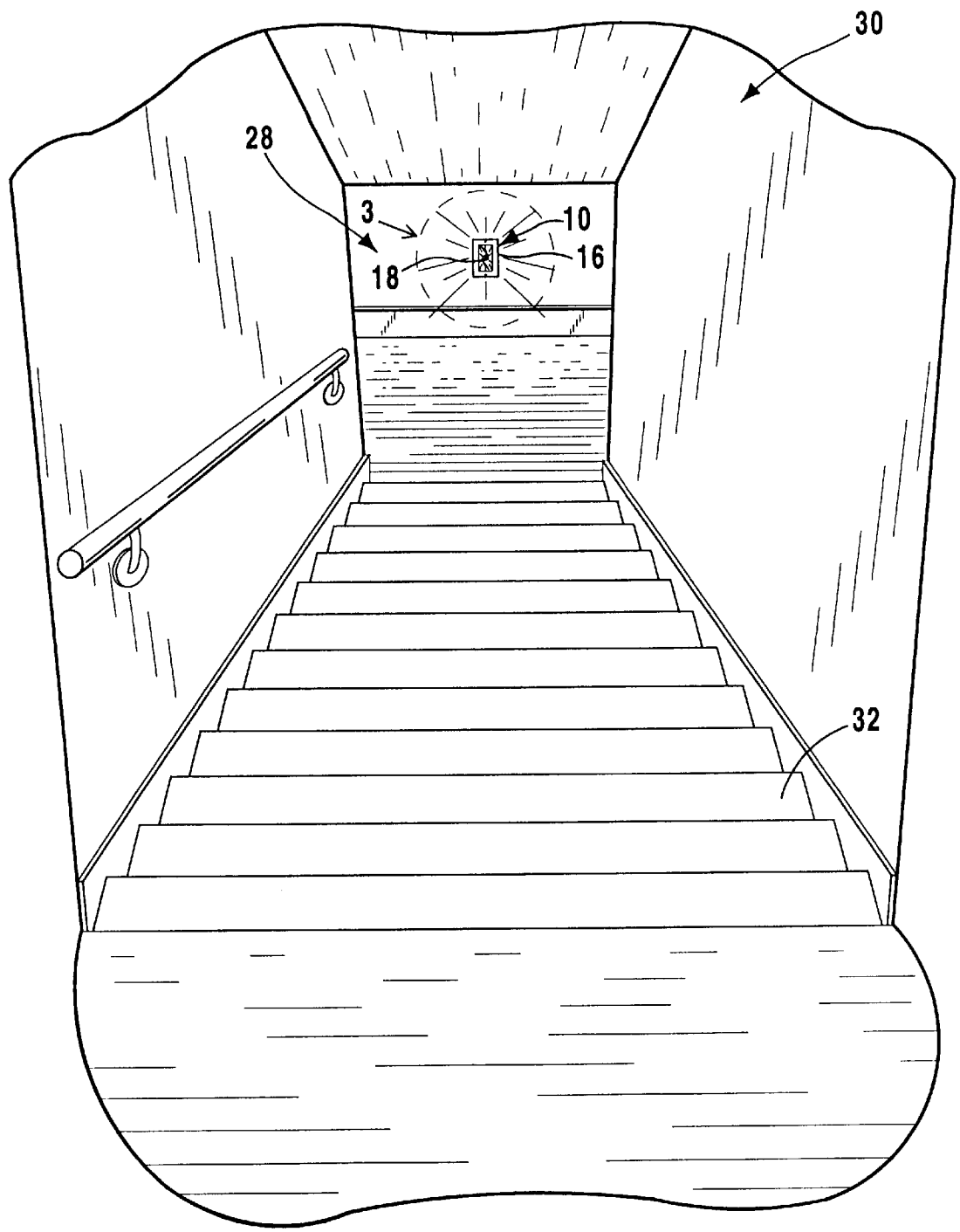
FIG. 2 is a perspective view of the apparatus for providing emergency and night lighting of the present invention positioned within a stairwell to be illuminated thereby either during a power failure or at night.

FIG. 2 illustrates the use of the apparatus for providing emergency and night lighting 10 in a hallway 28 adjacent a stairway 30. The apparatus for providing emergency and night lighting 10 is also able to provide lighting to an area therearound to aid persons seeing at nighttime or in a dimly lit area. The positioning of the apparatus for providing emergency and night lighting 10 in this area provides illumination to the stairway 30 and adjoining hallway 28 to aid a person climbing up and down the stairs 32 and thereby minimize the possibility of tripping on the stairs 32. Light would be provided to this area during a power outage and also at night if desired by the apparatus for providing emergency and night lighting 10.

Figure 3:
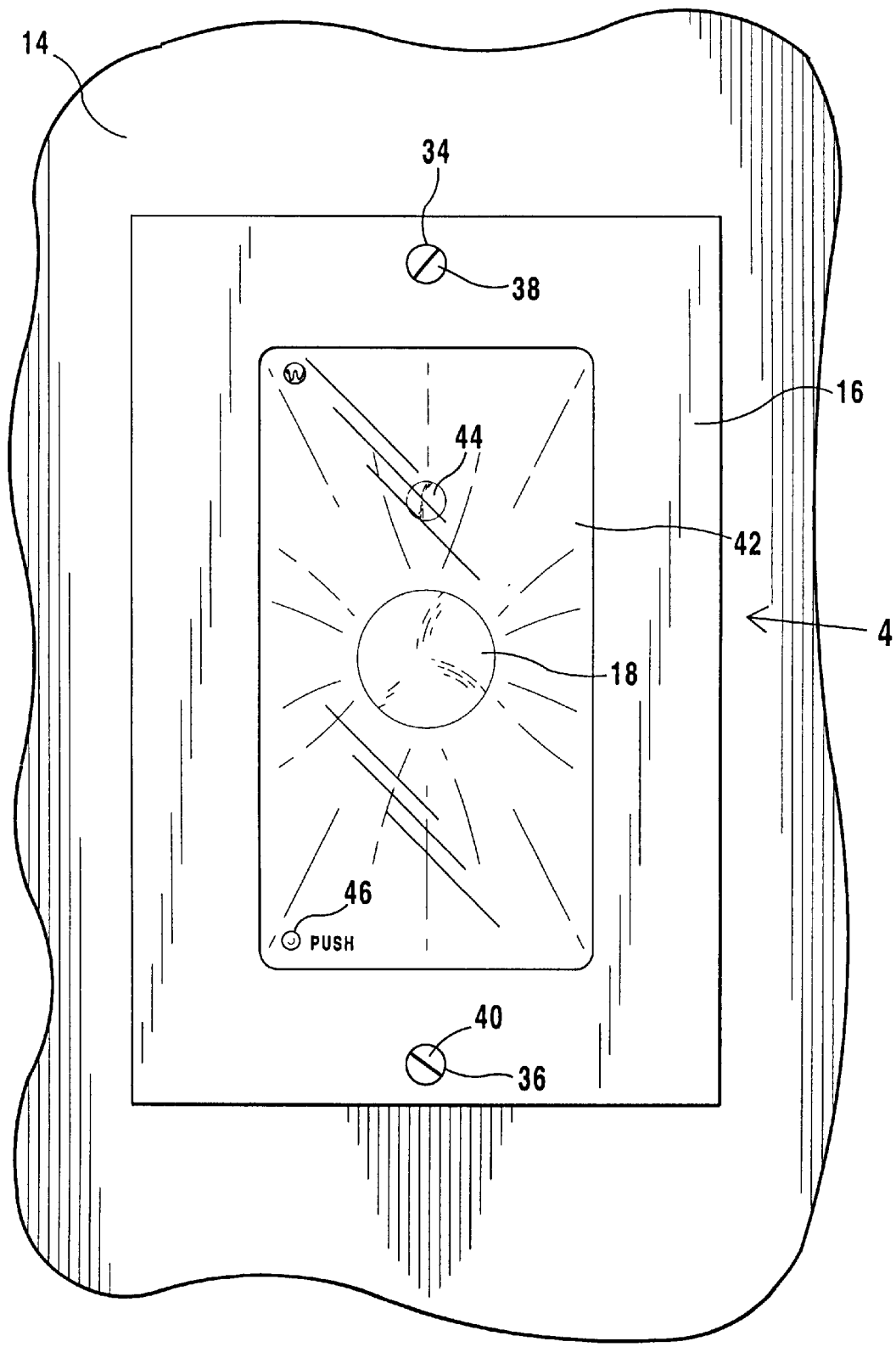
FIG. 3 is a front perspective view of the apparatus for providing emergency and night lighting of the present invention.

An enlarged front view of the apparatus for providing emergency and night lighting 10 is illustrated in FIG. 3. From this figure it can be seen that the apparatus for providing emergency and night lighting 10 is secured to the wall 14. Extending through the face plate 16 are first and second recesses 34 and 36. First and second fastening screws 38 and 40, respectively, are inserted through the first and second recesses 34 and 36 to secure the apparatus for providing emergency and night lighting 10 to the wall 14. The emergency light bulb 18 is visible through a clear lens 42 positioned in a central portion of the face plate 16. Also visible through the clear lens 42 is a second light bulb 44 used to provide additional lighting at all times such as a night light. A dimmer switch 46 extends from the clear lens 42 for controlling operation of the emergency light bulb 18. The dimmer switch 46 allows the user to either dim the light provided by or turn off the emergency light bulb 18 when illumination is not desired during a power outage.

Figure 4:
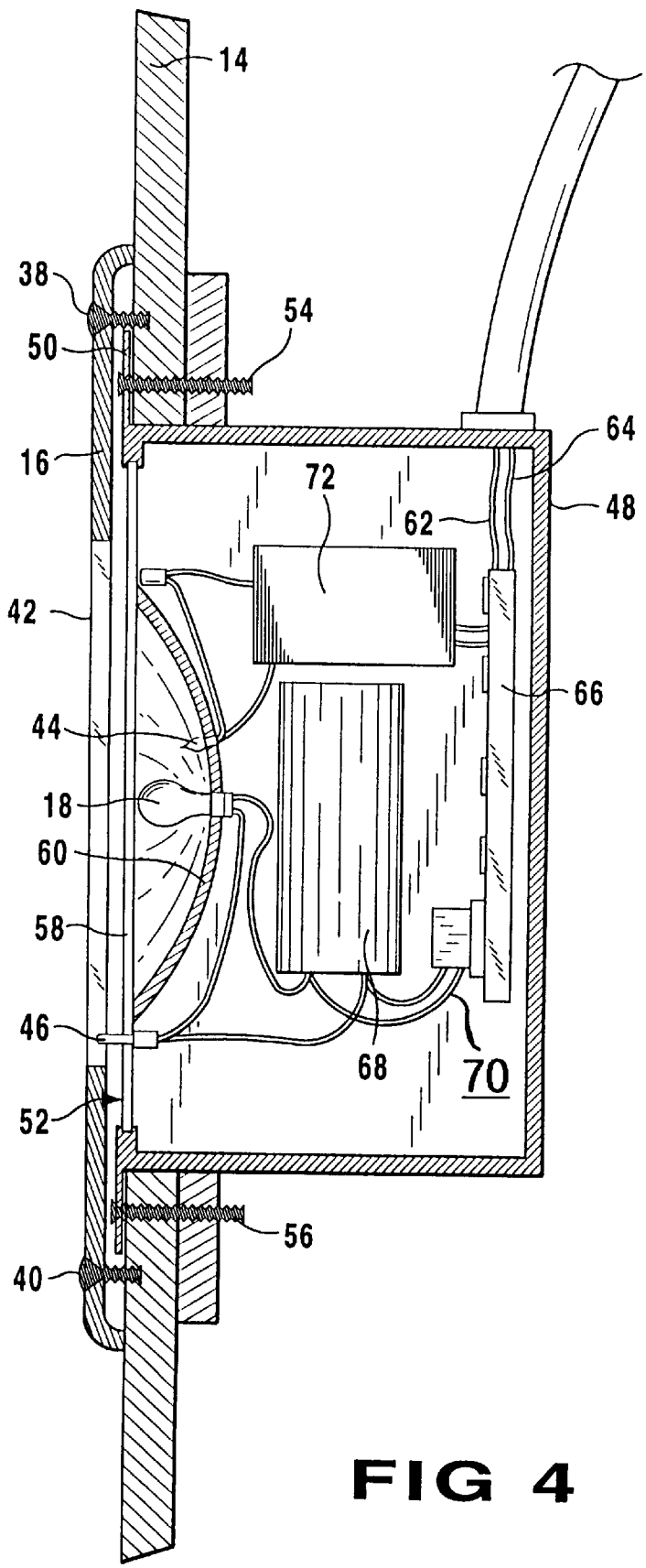
FIG. 4 is side partial cross-sectional view of the apparatus for providing emergency and night lighting of the present invention.

A side cross-sectional view of the apparatus for providing emergency and night lighting 10 is illustrated in FIG. 4. As can be seen from this view the apparatus for providing emergency and night lighting 10 includes a casing 48 for housing the electrical components of the apparatus for providing emergency and night lighting 10. The casing 48 includes a frame 50 extending around a face side 52 and is secured to the wall 14 by first and second securing screws 54 and 56 extending through the frame 50. A clear plane 58 is positioned to cover the face side 52 and the face plate 16 is secured to the wall. The clear lens 42 is positioned over the clear plane 58. Positioned behind the clear plane 58 is a reflective surface 60 through which the emergency light bulb 18 and the second light bulb 44 extend. Extending into the casing 48 are the 120 volt hot line 62 and the ground line 64. The 120 volt hot line 62 and the ground line 64 extend into a charging circuit 66. The charging circuit 66 is connected to a relay circuit 68 which upon detection of a power outage will cause the emergency light bulb 18 to illuminate by connecting an internal battery thereto via a connection wire 70. The dimmer switch 46 is connected between the relay 68 and the emergency light bulb 18 for reducing the amount of current flowing from the relay 68 to the emergency light bulb 18 and thereby reduce the intensity of illumination. The dimmer switch 46 can also interrupt the flow of current to the emergency light bulb 18 causing it to turn off. Also connected to the 120 volt hot line 60 and the ground line 62 is the second light bulb 44 via a photocell 72. The second light bulb 44 is always illuminated when power is being supplied thereto and acts as a night light to provide illumination to dimly lit areas or to provide illumination during night hours. Thus, a person is able to see clearly during night hours without interrupting others in the area who may be asleep.

Figure 5:
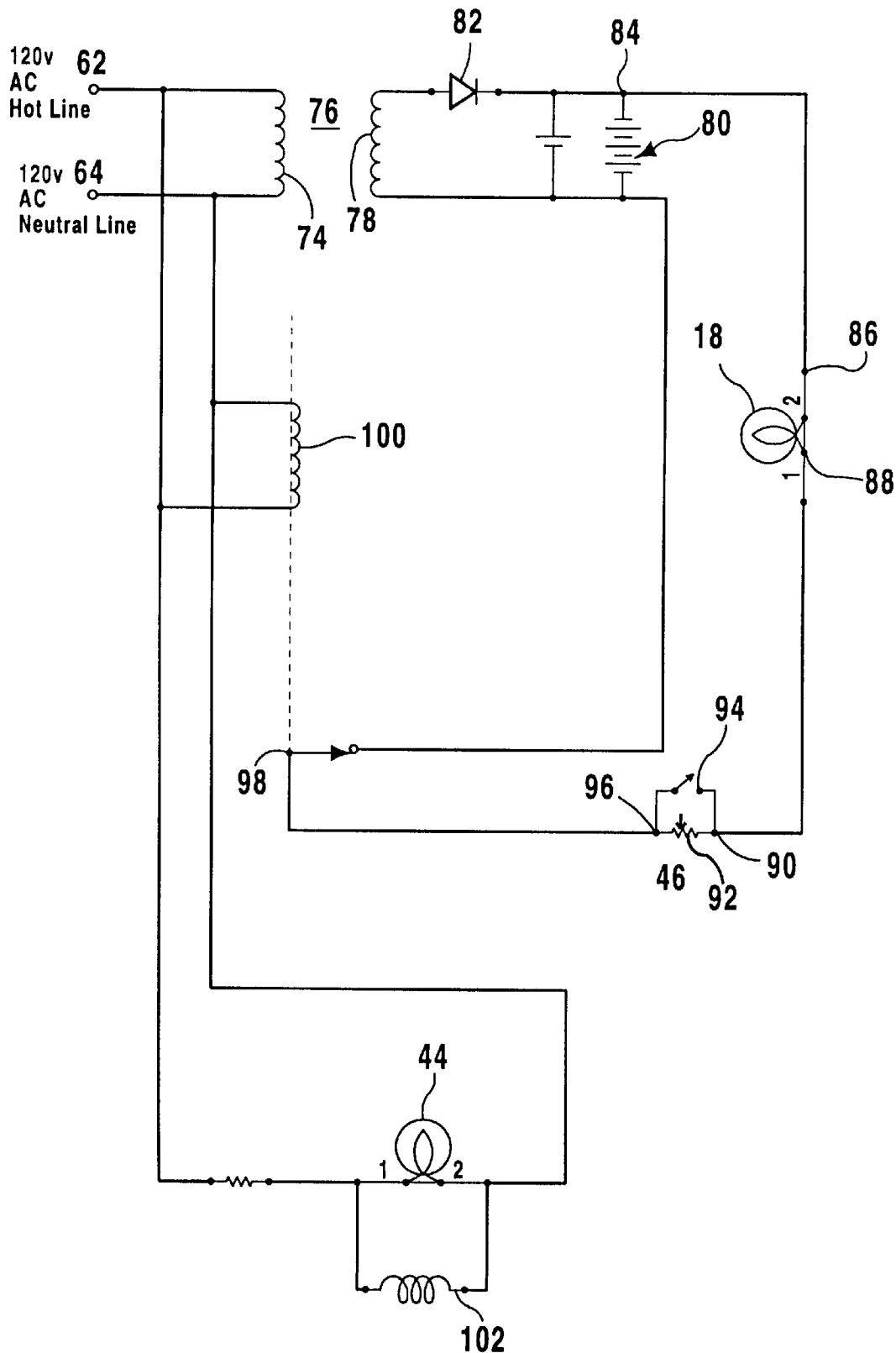
FIG. 5 is a schematic diagram of the apparatus for providing emergency and night lighting of the present invention.

FIG. 5 illustrates a schematic diagram of the apparatus for providing emergency and night lighting 10. As can be seen from this figure, the 120 volt AC hot and neutral lines 62 and 64, respectively, are connected to provide power to the apparatus for providing emergency and night lighting 10. The 120 volt AC hot line and the neutral line 62 and 64 are connected to the first winding 74 of a transformer 76. The second winding 78 is connected across the terminals of the battery 80 of the apparatus for providing emergency and night lighting 10. A diode 82 is connected between the battery 80 and the second winding 78. The battery 80 is a rechargeable battery which is recharged by the connection with the transformer 76 when power is flowing therethrough. A first terminal 84 of the battery 80 is connected to a first terminal 86 of the emergency light bulb 18. A second terminal 88 of the emergency light bulb 18 is connected to a first terminal 90 of the dimmer switch 46. The dimmer switch 46 includes a potentiometer 92 connected in parallel with an on/off switch 94. A second terminal 96 of the dimmer switch 46 is connected to a normally closed switch 98. In the closed position, the normally closed switch is connected to the second winding 78 of the transformer 76 to complete the circuit including the emergency light bulb 18 causing the emergency light bulb 18 to illuminate.

Also connected between the 120 volt AC hot and neutral lines 62 and 64 is a coil 100. The coil 100 is connected to control the opening and closing of the normally closed switch 98. When a voltage is applied to cause a current to flow through the coil 100, the coil 100 controls the normally closed switch 98 to open and prevent the voltage from the battery 80 to flow through the circuit. Thus, the emergency light bulb 18 is prevented from illuminating. When a power interruption occurs, the current no longer flows through the coil 100 and the normally closed switch 98 is allowed to return to its closed position completing the circuit and allowing the emergency light bulb 18 to illuminate.

The second light bulb 44 is also connected between the 120 volt AC hot and neutral lines 62 and 64. Connected in parallel with the second light bulb 44 is a photocell 102. When a potential is present across the hot and neutral lines 62 and 64, a current flows through the second light bulb 44 and photocell 102 causing the second light bulb 44 to illuminate. When a power interruption occurs, the second light bulb 44 will be extinguished until power is restored.

Figure 6:
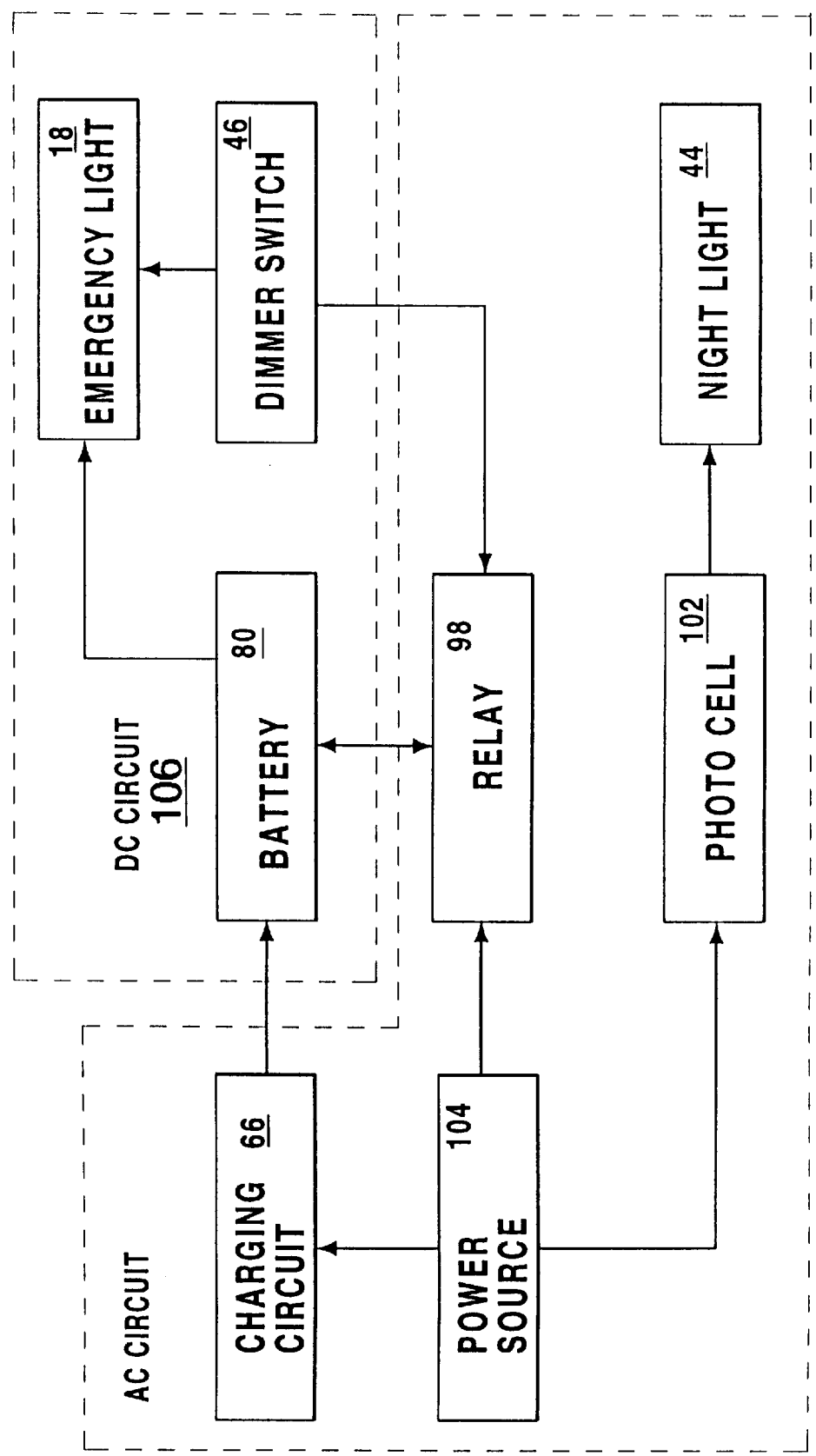
FIG. 6 is a block diagram illustrating the components of the apparatus for providing emergency and night lighting of the present invention.

A block diagram of the apparatus for providing emergency and night lighting 10 is illustrated in FIG. 6. This figure illustrates a power source 104 formed by the 120 volt AC hot and neutral lines 62 and 64 connected to the charging circuit 66 formed by the transformer 76, the relay 98 formed by the coil 102 and the normally closed switch 100 and the photocell 102. The rechargeable battery 80 is connected to the charging circuit 66 and to the emergency light 18. The dimmer switch 46 is connected between the emergency light 18 and the relay 98 for controlling the amount of current allowed to flow to from the rechargeable battery 80 to the emergency light 18 if any. When the power source 104 is not interrupted, the relay 98 is caused to open the DC circuit 106 and prevent current from flowing therethrough. This prevents the emergency light 18 from illuminating. The power source 104 supplies this power to the charging circuit 66 which acts to recharge the battery 80 during times in which power is not interrupted. When power is interrupted, power is no longer supplied to either the charging circuit 66 or the relay 98. The relay 98 is thus caused to close the DC circuit 106. The closed DC circuit 106 allows a current supplied by the battery 80 to flow through the emergency light 18 causing it to illuminate. The dimmer switch 46 is used to manually control the resistance of the circuit thereby controlling the intensity of illumination of the emergency light 18.

The night light 44 is connected directly to the power source 104 via a photocell 102. Thus, a current is caused to flow through the night light 44 at all times power is not interrupted causing the night light to be constantly illuminated. When power to the power source 104 is interrupted, the night light 44 is caused to be extinguished and the emergency light 18 becomes illuminated as described above.

Figure 7B:
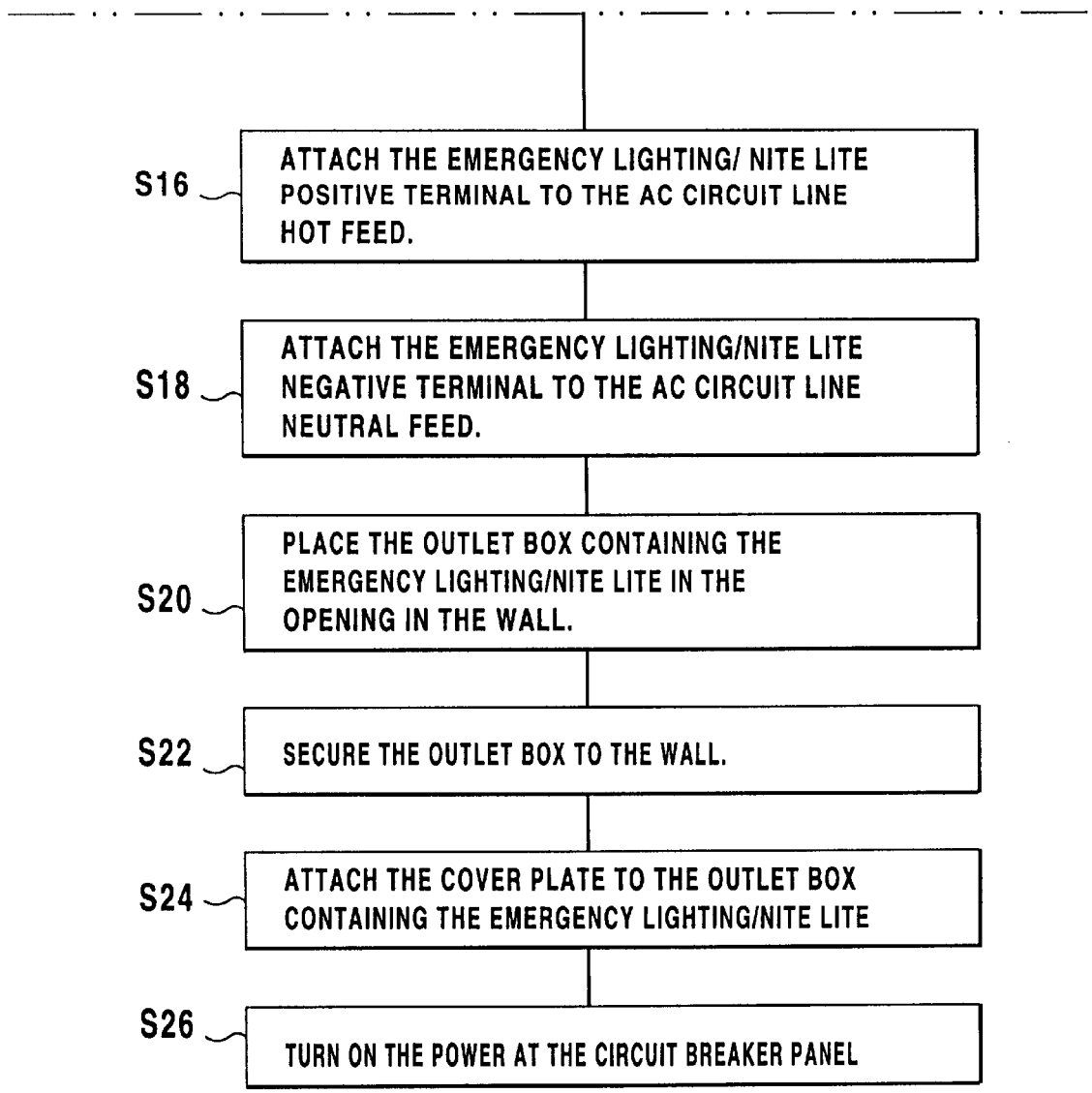

The procedure for installing the apparatus for providing emergency and night lighting 10 of the present invention will now be described with reference to the figures and specifically FIG. 7. Prior to installing the apparatus for providing emergency and night lighting 10 of the present invention, a suitable location must be determined as described in step S2. This location should preferably illuminate an area through which there is a great deal of traffic and an area in which emergency lighting would be desirable. The apparatus for providing emergency and night lighting 10 should not be positioned behind objects which would obstruct the illumination of the area in which it is placed and thus defeat the purpose of the device 10. Exemplary positions for placement include highly traveled through hallways, stairways, areas in which persons normally gather and the like so as to provide illumination to the most popular areas of a building or dwelling should a power failure occur. The desired position of the emergency lighting device 10 must also include a 120 volt AC power line nearby for connection thereto. This power line must be located for connection to the apparatus for providing emergency and night lighting 10 as stated in step S4.

Once the position for the apparatus for providing emergency and night lighting 10 is determined and the power line is located it is time to install the apparatus for providing emergency and night lighting 10 in the wall. Prior to installation, the power to the power line to be connected to the apparatus for providing emergency and night lighting 10 should be turned off at the circuit breaker panel as discussed in step S6. Next, the template or face plate 16 is placed at the desired location for placement of the apparatus for providing emergency and night lighting 10 and an opening is cut in the wall along the dotted lines printed on the template as described in steps S8 and S10. The position of the apparatus for providing emergency and night lighting 10 is now set.

The outer covering on the AC circuit line will now be stripped at the point at which the apparatus for providing emergency and night lighting 10 will be connected as discussed in step S12. Once stripped, the hot and neutral AC circuit source lines 62 and 64 will be cut as stated in step S14. The hot line 62 of the AC circuit source is then connected to the positive terminal of the apparatus for providing emergency and night lighting 10 and the neutral line 64 of the AC circuit source is then connected to the negative terminal of the apparatus for providing emergency and night lighting 10 as described in steps S16 and S18. Once the hot and neutral lines 62 and 64 are connected, the casing or outlet box 48 is positioned in the wall 14 and secured thereto, preferably by securing the screws 54 and 56 to the wall 14 through the frame 50 as stated in steps S20 and S22. The cover or face plate 16 is then secured over the outlet box 48 as discussed in step S24 and the power may be turned on again at the circuit breaker as stated in step S26. The apparatus for providing emergency and night lighting 10 is now ready for use.

At this time power is supplied to the apparatus for providing emergency and night lighting 10 and the night light 44 is caused to turn on. The relay 98 is held in the open position disconnecting the emergency light bulb 18 from the battery 80 and preventing it from becoming illuminated. A power is induced in the second coil 78 of the transformer 76 causing the transformer 76 to recharge the battery 80.

When a power interruption occurs, current is prevented from flowing to the night light 44 causing it to be extinguished. Current is also prevented from flowing to the coil 100 of the relay 98 causing the normally closed switch 98 to close and thereby close the DC circuit 106. Closing of the DC circuit 106 allows the battery 80 to provide a current to the emergency light 18 causing it to illuminate. Control of the intensity of illumination is performed by adjusting the dimmer switch 46. The dimmer switch 46 can also be controlled to turn off the emergency light 18 by opening the on/off switch 94. When power is restored, the relay 98 will open causing the DC circuit 106 to open and the emergency light to extinguish. Current will once again flow to the night light 44 causing it to again illuminate.

From the above description it can be seen that the apparatus for providing emergency and night lighting of the present invention is able to overcome the shortcomings of prior art devices by providing an apparatus for providing emergency and night lighting which is able to detect the occurrence of a power failure and provide emergency lighting upon detection of the power failure. The apparatus for providing emergency and night lighting includes an automatically rechargeable power source to prevent the device from malfunction due to a drained power source and an additional light bulb for providing lighting to unlit areas or during nighttime hours. The apparatus for providing emergency and night lighting also includes a dimmer switch for reducing the intensity of the emergency light and an on/off switch for selectively turning the emergency light off during a power outage. Furthermore, the apparatus for providing emergency and night lighting of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for providing illumination to a selected area independent of detection of a failure of a power source, said apparatus mounted within a casing comprising:

a) a transformer having a first winding connected to an AC power source and a second winding connected to a DC charging circuit;

b) a rechargeable battery connected to and for charging by said DC charging circuit;

c) an emergency light connected to the terminals of said battery;

d) a detection switch biased in the closed position connected between said battery and said light so that said light is energized when said switch is closed;

e) means in response to AC power across said transformer to hold said switch in the open position comprising a third winding connected across said first winding of said transformer arranged to open said switch when current is flowing in said third winding so that the emergency light is energized only when there is a loss of AC power at said transformer;

f) a second light connected directly to said first winding of said transformer for providing illumination whenever there is AC power thereby indicating the presence of said AC power;

g) a dimmer switch connected between said emergency light and said detection switch for limiting an amount of voltage applied by said battery to said emergency light, and including means for selectively disconnecting said battery from said emergency light; and h) said casing mounted on a wall and having a reflector for said emergency light, said second light being mounted in said reflector adjacent said emergency light with one wall of said casing being a clear plane covering face side opposite said reflector, and said dimmer switch mounted through said face side.

\* \* \* \* \*